(12) United States Patent
Chen et al.

(10) Patent No.: US 12,342,061 B2
(45) Date of Patent: Jun. 24, 2025

(54) CAMERA APPARATUS AND WINDER SYSTEM

(71) Applicant: CONTEMPORARY AMPEREX TECHNOLOGY (HONG KONG) LIMITED, Hong Kong (CN)

(72) Inventors: Zhipeng Chen, Ningde (CN); Chao Chen, Ningde (CN); Siying Huang, Ningde (CN); Wei Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 257 days.

(21) Appl. No.: 18/077,313

(22) Filed: Dec. 8, 2022

(65) Prior Publication Data

US 2023/0109550 A1    Apr. 6, 2023

Related U.S. Application Data

(63) Continuation of application No. PCT/CN2021/115519, filed on Aug. 31, 2021.

(51) Int. Cl.
*H04N 23/54* (2023.01)
*H01M 10/04* (2006.01)
*H04N 23/69* (2023.01)

(52) U.S. Cl.
CPC ........ *H04N 23/54* (2023.01); *H01M 10/0409* (2013.01); *H04N 23/69* (2023.01)

(58) Field of Classification Search
CPC .............................. H04N 23/54; H04N 23/69
See application file for complete search history.

(56) References Cited

U.S. PATENT DOCUMENTS 4,640,598 A * 2/1987 Yoshida ............... G03B 17/425
                                                            396/502
4,769,665 A * 9/1988 Dagborn ................ G03B 17/24
                                                            396/541

(Continued)

FOREIGN PATENT DOCUMENTS

CN    203606301 U    5/2014
CN    207751901 U    8/2018

(Continued)

OTHER PUBLICATIONS

Supplemental Partial European Search Report for EP application No. 21925089, mailed Apr. 21, 2023.

(Continued)

*Primary Examiner* — Irfan Habib
(74) *Attorney, Agent, or Firm* — Ladas & Parry LLP

(57) ABSTRACT

Embodiments of the present disclosure provide a winder system that includes a battery winder and a camera apparatus. The battery winder is configured to wind a positive electrode plate and a negative electrode plate of a battery. The camera apparatus includes: a camera and a lens, where an angle between a sensor target plane of the camera and a lens plane of the lens is a predetermined angle, and the predetermined angle is greater than 0 degree and less than or equal to 20 degrees. The camera apparatus is configured to obtain images of the positive electrode plate and images of the negative electrode plate concurrently. The camera apparatus according to the present disclosure can implement focusing of images on different working planes, thereby obtaining clear images of both positive electrode features and negative electrode features concurrently with a single camera.

20 Claims, 5 Drawing Sheets

(56) References Cited

U.S. PATENT DOCUMENTS

| | | | | | |
|---|---|---|---|---|---|
| 4,816,851 | A | * | 3/1989 | Fukahori | G03B 17/425 396/401 |
| 5,899,584 | A | * | 5/1999 | Balling | G03B 17/425 396/6 |
| 5,917,545 | A | * | 6/1999 | Kowno | H04N 1/2112 348/E5.025 |
| 7,463,822 | B2 | * | 12/2008 | Chan | G03B 19/06 396/6 |
| 7,688,031 | B2 | * | 3/2010 | Asakura | H02J 7/0031 320/124 |
| 2023/0018968 | A1 | * | 1/2023 | Byon | H04N 23/51 |
| 2024/0262291 | A1 | * | 8/2024 | Fu | H04N 23/55 |

FOREIGN PATENT DOCUMENTS

| CN | 108695559 A | 10/2018 |
|---|---|---|
| CN | 109358064 A | 2/2019 |
| CN | 111351799 A | 6/2020 |
| CN | 211601861 U | 9/2020 |
| CN | 112229846 A | 1/2021 |
| CN | 112311971 A | 2/2021 |
| CN | 213340470 U | 6/2021 |
| CN | 113218945 A | 8/2021 |
| CN | 113267145 A | 8/2021 |
| JP | H0279808 A | 3/1990 |
| JP | H0566628 U | 9/1993 |
| JP | 2001174215 A | 6/2001 |
| JP | 2001194715 A | 7/2001 |
| JP | 2008046103 A | 2/2008 |

OTHER PUBLICATIONS

Extended European search report for EP application No. 21925089.1, dated Sep. 4, 2023.
International search report for Application No. PCT/CN2021/115519. malled Jun. 9, 2022, 5 pages.
Written Opinion of International search authority for Application No. PCT/CN2021/115519. mailed Jun. 9, 2022, 4 pages.

* cited by examiner

CAMERA APPARATUS AND WINDER SYSTEM

CROSS REFERENCE TO RELATED APPLICATION

This application is a continuation of International Patent Application No. PCT/CN2021/115519, filed on Aug. 31, 2021, which is incorporated by reference in its entirety.

TECHNICAL FIELD

The present disclosure relates to the technical field of battery manufacturing, and in particular, to a camera apparatus and a winder system.

BACKGROUND

In a process of winding webs on a battery winder to manufacture a battery cell, winding positions of a positive electrode plate, a negative electrode plate, a first separator, and a second separator in each layer of web needs to be detected. In a case that the winding positions are out of a specified position, an alarm is raised, and the battery cell is discarded. Misalignment between the electrode plate and the separator needs to be monitored on the winder in real time by using a charge-coupled device (CCD), and a calculation result is fed back to a host computer software to ensure that indicators such as key dimensions of the battery cell satisfy production standards.

In the related art, features of the positive electrode plate and the negative electrode plate need to be captured by two independent cameras. In a case that a relative position or angle between the two cameras is changed due to continuous vibration of a stand in a long production process, positions of the features to be detected in the image may be offset accordingly, and accumulated errors increase progressively.

SUMMARY

In view of the foregoing problems, the present disclosure provides a camera apparatus and a winder system so that positive electrode features and negative electrode features can be captured with a single camera.

According to a first aspect, the present disclosure provides a camera apparatus, including: a camera and a lens, where an angle between a sensor target plane of the camera and a lens plane of the lens is a predetermined angle, and an angle value of the predetermined angle is greater than 0 degree and less than or equal to 20 degrees.

In the technical solution of embodiments of the present disclosure, in a winding process of a battery winder, a positive feature detection region and a negative electrode feature detection region are on different working planes. A distance (such as 100 mm) between the different working planes is far greater than a depth of field (such as 5 to 15 mm) of a conventional camera. In this case, a single camera in a conventional solution is unable to concurrently obtain clear images of both the positive electrode features and the negative electrode features. Because the angle between the sensor target plane of the camera and the lens plane of the lens according to the foregoing embodiment of the present disclosure is a predetermined angle, the camera apparatus can implement focusing of images on different working planes, thereby obtaining clear images of both positive electrode features and negative electrode features concurrently with a single camera.

In some embodiments, the camera apparatus is mounted at a target position with respect to a battery winder, and is configured to obtain image information of a first detection region and image information of a second detection region concurrently. The target position is determined based on the predetermined angle. The battery winder is configured to wind the positive electrode plate of a battery and a negative electrode plate of the battery. The image information of the first detection region includes positive electrode features of the positive electrode plate, and the image information of the second detection region includes negative electrode features of the negative electrode plate. The target position of the camera apparatus with respect to the winder and the predetermined angle of the camera apparatus enable the camera apparatus to concurrently obtain clear images of both the positive electrode features and the negative electrode features.

In some embodiments, the predetermined angle and the target position make the first detection region and the second detection region concurrently satisfy a Gaussian imaging formula. According to the present disclosure, through gradual adjustment, the camera apparatus is mounted at the target position with respect to the battery winder. The first detection region and the second detection region can concurrently satisfy the Gaussian imaging formula in a novel optical imaging mode by adjusting a back focal length, thereby implementing focusing of images on different working planes.

In some embodiments, that the first detection region and the second detection region concurrently satisfy the Gaussian imaging formula is: a distance between the first detection region and a center of the lens plane of the lens, a distance between the center of the lens plane of the lens and a first imaging point of the sensor target plane of the camera, and a focal length of the lens satisfy the Gaussian imaging formula; and concurrently, a distance between the second detection region and the center of the lens plane of the lens, a distance between the center of the lens plane of the lens and a second imaging point of the sensor target plane of the camera, and the focal length of the lens satisfy the Gaussian imaging formula.

In some embodiments, the camera apparatus further includes: a connecting module disposed between the camera and the lens, where the connecting module is configured to implement fastening between the camera and the lens. The present disclosure implements the fastening between the camera and the lens through the connecting module. In this way, the present disclosure can use just a single camera to capture the positive electrode features and the negative electrode features. In addition, the connecting module in hardware design prevents the relative position between the positive electrode plate and the negative electrode plate from being offset by continuous vibration of a stand in a long production process.

In some embodiments, the connecting module includes a lens connecting surface and a camera connecting surface. The lens connecting surface is a connecting surface between the connecting module and the lens. The camera connecting surface is a connecting surface between the connecting module and the camera. An angle between the lens connecting surface and the camera connecting surface is equal to the predetermined angle. In the present disclosure, the angle between the lens connecting surface and the camera connecting surface of the connecting module is set to be the predetermined angle. In this way, during fastening between the camera and the lens, the angle between the sensor target plane of the camera and the lens plane of the lens can be fixedly set to be the predetermined angle.

In some embodiments, the connecting module includes a first connecting piece and a second connecting piece. The first connecting piece is configured to implement fastening to the lens and fastening to the second connecting piece. The second connecting piece is configured to implement fastening to the camera. An upper surface of the first connecting piece is the lens connecting surface, a lower surface of the first connecting piece is connected to an upper surface of the second connecting piece, and a lower surface of the second connecting piece is the camera connecting surface. In some of the foregoing embodiments of the present disclosure, the connecting module includes a first connecting piece and a second connecting piece. The lens can be fastened to the camera more conveniently by the two connecting pieces.

In some embodiments, the angle between the upper surface of the first connecting piece and the lower surface of the first connecting piece is equal to the predetermined angle. The upper surface of the second connecting piece is parallel to the lower surface of the second connecting piece. In some embodiments of the present disclosure, the upper and lower surfaces of the first connecting piece may be inclined. To be specific, the first connecting piece serves to implement fastening between the lens and the second connecting piece, and, by causing the angle between the upper surface and the lower surface of the first connecting piece to be equal to the predetermined angle, make the overall inclination of the connecting module satisfy the predetermined angle. In some embodiments of the present disclosure, the second connecting piece serves to implement fastening between the first connecting piece and the camera.

In some embodiments, the connecting module includes a first connecting piece. The first connecting piece is configured to implement fastening to the lens and fastening to the camera. An upper surface of the first connecting piece is the lens connecting surface, and a lower surface of the first connecting piece is the camera connecting surface. In some embodiments of the present disclosure, the connecting module includes just the first connecting piece. The upper and lower surfaces of the first connecting piece are inclined. To be specific, the first connecting piece serves to implement fastening between the lens and the camera, and, by causing the angle between the upper surface and the lower surface of the first connecting piece to be equal to the predetermined angle, make the overall inclination of the connecting module satisfy the predetermined angle.

In some embodiments, an angle between the upper surface and the lower surface of the first connecting piece is adjustable. The camera apparatus further includes a camera control device. The camera control device is configured to obtain a positional relationship between a first detection region and a second detection region, determine the predetermined angle and a target position based on the positional relationship between the first detection region and the second detection region, adjust the angle between the upper surface and the lower surface of the first connecting piece to the predetermined angle, and mount the camera apparatus to the target position. In some embodiments of the present disclosure, an angle between the upper surface and the lower surface of the first connecting piece is adjustable. The camera apparatus further includes a camera control device. The camera control device determines the predetermined angle and a target position based on the positional relationship between the first detection region and the second detection region, adjusts the camera apparatus to satisfy the predetermined angle, and mounts the camera apparatus to the target position. In this way, the predetermined angle can be satisfied through adjustment based on the positional relationship between the first detection region and the second detection region.

In some embodiments, the camera apparatus further includes a camera control device. The camera control device is configured to instruct a manufacturing device to prepare beforehand a plurality of first connecting pieces of which the upper surfaces are at different angles to the lower surfaces, obtain a positional relationship between a first detection region and a second detection region, determine the predetermined angle and a target position based on the positional relationship between the first detection region and the second detection region, select a first connecting piece with an angle between an upper surface and a lower surface equal to the predetermined angle as a first connecting piece to be applied, and mount the camera apparatus to the target position. In some embodiments of the present disclosure, a plurality of first connecting pieces of which the upper surfaces are at different angles to the lower surfaces are prepared beforehand. The camera apparatus further includes a camera control device. The camera control device determines the predetermined angle and a target position based on the positional relationship between the first detection region and the second detection region, selects a first connecting piece with an angle between the upper surface and the lower surface being equal to the predetermined angle, uses the first connecting piece as a first connecting piece to be applied, and relocates the camera apparatus to the target position. In this way, based on the positional relationship between the first detection region and the second detection region, the first connecting piece with a different predetermined angle can be selected for adapting to actual needs.

According to a second aspect, the present disclosure provides a winder system, including a battery winder and the camera apparatus according to any one of the embodiments described above.

The foregoing description is merely an overview of the technical solutions of the present disclosure. The following sets forth specific embodiments of the present disclosure to impart the technical solutions of the present disclosure more clearly, enable implementation based on the content of the specification, and make the foregoing and other objectives, features, and advantages of the present disclosure more explicit and comprehensible.

BRIEF DESCRIPTION OF DRAWINGS

To describe the technical solutions in the embodiments of the present disclosure more clearly, the following outlines the drawings used in the embodiments of the present disclosure. Evidently, the drawings outlined below are merely a part of embodiments of the present disclosure. A person of ordinary skill in the art may derive other drawings from the outlined drawings without any creative efforts.

Figure 1:
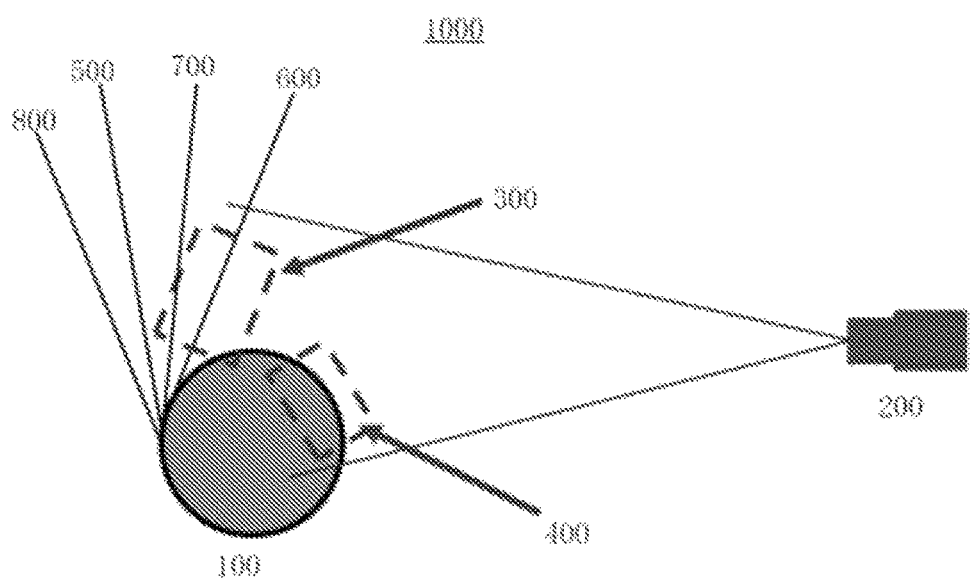
FIG. 1 is a schematic structural diagram of a winder system according to some embodiments of the present disclosure.

The drawings are not drawn to scale.

REFERENCE NUMERALS vehicle 1000;
battery winder 100,
camera apparatus 200,
first detection region 300,
second detection region 400,
negative electrode plate 500,
positive electrode plate 600,
first separator 700,
second separator 800;
camera 4,
lens 1,
first connecting piece 2,
second connecting piece 3,
camera control device 5;
camera sensor target plane 41,
lens plane 11;
lens plane center 111,
first imaging point 411 of the sensor target plane of the camera,
second imaging point 412 of the sensor target plane of the camera.

DETAILED DESCRIPTION

Embodiments of the technical solutions of the present disclosure are described in detail below with reference to the drawings. The following embodiments are merely intended to describe the technical solutions of the present disclosure more clearly, and are merely exemplary but without hereby limiting the protection scope of the present disclosure.

Unless otherwise defined, all technical and scientific terms used herein have the same meanings as usually understood by a person skilled in the technical field of the present disclosure. The terms used herein are merely intended for describing specific embodiments but are not intended to limit the present disclosure. The terms "include" and "contain" and any variations thereof used in the specification, claims, and brief description of drawings of the present disclosure are intended as non-exclusive inclusion.

In the description of the embodiments of the present disclosure, the technical terms "first" and "second" are merely intended to distinguish between different items but not intended to indicate or imply relative importance or implicitly specify the number of the indicated technical features, the specific order, or order of precedence. In the description of the embodiments of the present disclosure, unless otherwise expressly specified, "a plurality of" means two or more.

Reference to "embodiment" herein means that a specific feature, structure or characteristic described with reference to the embodiment may be included in at least one embodiment of the present disclosure. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of the present disclosure, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of the present disclosure, the term "a plurality of" means two or more (including two). Similarly, "a plurality of groups" means two or more groups (including two groups), and "a plurality of pieces" means two or more pieces (including two pieces).

In the description of embodiments of the present disclosure, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of the present disclosure, but not intended to indicate or imply that the indicated device or component is necessarily located in the specified direction or constructed or operated in the specified direction. Therefore, such terms are not to be understood as a limitation on embodiments of the present disclosure.

In the description of embodiments of the present disclosure, unless otherwise expressly specified and qualified, the technical terms such as "mounting", "concatenation", "connection", and "fixing" need to be understood in a broad sense, for example, understood as a fixed connection or a detachable connection or understood as being integrated into a whole; or understood be as a mechanical connection or an electrical connection, a direct connection or an indirect connection implemented through an intermediary; or understood as interior communication between two components or interaction between two components. A person of ordinary skill in the art understands the specific meanings of the terms in embodiments of the present disclosure according to the context.

Currently, in a production process of a lithium-ion battery, a winding process is involved, in which a negative electrode plate, a positive electrode plate, and a separator are wound into a complete half-cell. During the winding, the degree of misalignment between the negative electrode plate, the positive electrode plate, and the separator needs to fall within a range of ±0.5 mm. Beyond that range, the misalignment leaves a battery cell to be at risk of short circuits. The short circuit of the battery cell in use may cause a fire or even explosion. Therefore, the winding process needs to be monitored in real time by using a reliable detection method, so as to avoid pass of a battery cell of substandard dimensions to a subsequent process.

During the winding of a battery cell, the alignment between webs in a first detection region (an in-feed section of the battery cell) and the alignment between webs in a second detection region (a roll section of the battery cell) need to be detected concurrently. The first detection region and the second detection region are located on different working planes. Therefore, the camera apparatus need to focus on different working planes concurrently.

In the related art, a camera apparatus includes two camera kits: a first camera kit configured to detect the alignment between webs in the in-feed section of the battery cell; and a second camera kit configured to detect the alignment between webs of the roll section of the battery cell. The solution in the related art requires two independent cameras that work in relation to each other to detect the alignment of the positive and negative electrode plates of the battery cell.

The technical solution in the related art requires two independent cameras to work in relation to each other. In a case that a relative position or angle between the two cameras is changed due to continuous vibration of a stand in a long production process, positions of the features to be detected in the image may be offset accordingly, and accumulated errors increase progressively. In such a technical solution, the steadiness of the camera on the vibrating stand is not ensured. In other words, the solution that relies on calibration of a coordinate system between two cameras is inherently at high risk of unsteadiness. In view of the problem above, the present disclosure aims to design a camera structure that is steady in structure and capable of using a single camera to capture features of the positive and negative electrode plates.

Another technical solution in the related art is to capture the features of the positive and negative electrode plates with a single camera on condition that the winder uses a prismatic winding needle. However, this technical solution is applicable only to prismatic winding needles where an in-feed position and a winding position are on the same working plane, but not applicable to circular winding needles (in most existing machine models, the in-feed position and the winding position are not on the same working plane). In this technical solution, a tension of a prismatic winding needle changes periodically during the winding, being adverse to steadiness of a winding product.

Therefore, it is necessary to design a camera apparatus that is steady in structure and capable of using a single camera to capture features of positive and negative electrode plates where the in-feed position and the winding position are not on the same working plane.

The camera apparatus disclosed in embodiments of the present disclosure is applicable to, but without limitation, a winder system, and is applicable to, but without limitation, a winding process during production of a battery. The camera apparatus according to the present disclosure can implement focusing of images on different working planes in a novel optical imaging mode by adjusting a back focal length.

For ease of description, the following describes some embodiments of the present disclosure using a winder system applicable to a production process of batteries as an example.

Referring to FIG. 1, FIG. 1 is a schematic structural diagram of a winder system according to some embodiments of the present disclosure. The winder system 1000 includes a battery winder 100 and a camera apparatus 200. A winding needle of the battery winder 100 is a circular winding needle. A first detection region and a second detection region are located on different working planes. Therefore, the camera apparatus need to focus on different working planes concurrently.

In some embodiments of the present disclosure, the winding needle of the winder system according to the present disclosure may be a prismatic winding needle or an elliptical winding needle instead.

The battery winder 100 is configured to wind a positive electrode plate and a negative electrode plate of a battery.

Figure 2:
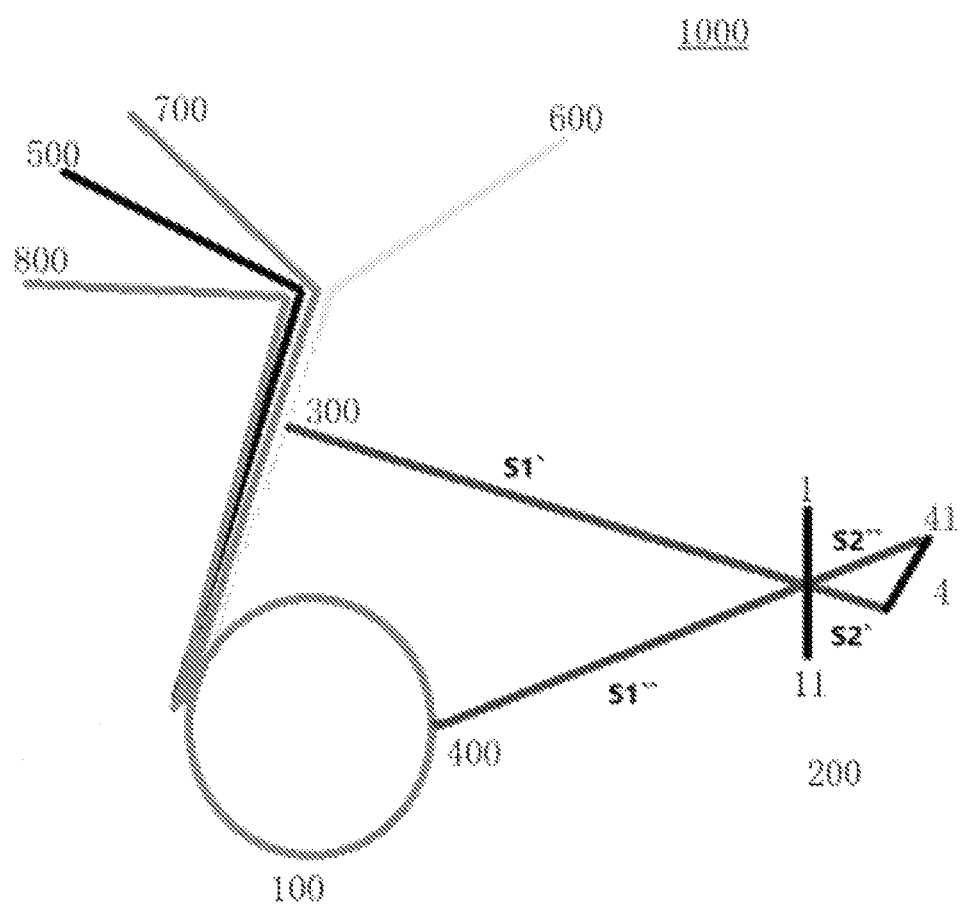
FIG. 2 is a schematic diagram of a winder system according to other embodiments of the present disclosure.

The camera apparatus 200 is configured to detect and obtain image information of the first detection region 300 and image information of the second detection region 400. The image information of the first detection region 300 is image information of each web in an in-feed section of a battery cell. The image information of the second detection region 400 is image information of each web in a roll section of the battery cell. As shown in FIG. 2, each layer of web includes a negative electrode plate 500, a positive electrode plate 600, a first separator 700, and a second separator 800.

In some embodiments of the present disclosure, as shown in FIG. 1, the image information of the first detection region 300 includes positive electrode features of the positive electrode plate. The image information of the second detection region 400 includes negative electrode features of the negative electrode plate.

Referring to FIG. 2, FIG. 2 is a schematic diagram of a winder system according to other embodiments of the present disclosure. The winder system 1000 includes a battery winder 100 and a camera apparatus 200. As shown in FIG. 2, the camera apparatus according to the present disclosure may include: a camera 4 and a lens 1. An angle between a sensor target plane 41 of the camera 4 and a lens plane 11 of the lens 1 is a predetermined angle. An angle value of the predetermined angle is greater than 0 degree and less than or equal to 20 degrees.

In the technical solution of embodiments of the present disclosure, in a winding process of the battery winder, a positive feature detection region and a negative electrode feature detection region are on different working planes. A distance between the different working planes is far greater than a depth of field of a conventional camera. In this case, a single camera in a conventional solution is unable to concurrently obtain clear images of both the positive electrode features and the negative electrode features. However, according to the foregoing embodiments of the present disclosure, the angle between the sensor target plane of the camera and the lens plane of the lens is set to satisfy a predetermined angle. In this way, the camera apparatus according to the foregoing embodiments of the present disclosure can implement focusing of images on different working planes, thereby obtaining clear images of both positive electrode features and negative electrode features concurrently with a single camera.

In some embodiments, as shown in FIG. 1 and FIG. 2, the camera apparatus 200 is mounted at a target position with respect to a battery winder 100, and is configured to obtain image information of a first detection region and image information of a second detection region concurrently. The target position is determined based on the predetermined angle. The battery winder is configured to wind the positive electrode plate of a battery and a negative electrode plate of the battery. The image information of the first detection region includes positive electrode features of the positive electrode plate, and the image information of the second detection region includes negative electrode features of the negative electrode plate. The target position of the camera apparatus with respect to the winder and the predetermined angle of the camera apparatus enable the camera apparatus to concurrently obtain clear images of both the positive electrode features and the negative electrode features.

In some embodiments of the present disclosure, a working distance between the camera apparatus 200 and the battery winder 100 may be 260 mm; and a distance between the camera apparatus 200 and a winding mandrel in a vertical direction (a height direction) may be 40 mm.

In some embodiments of the present disclosure, an imaging precision of the camera apparatus for the first detection region may be 0.03 mm/px, and an imaging precision of the camera apparatus for the second detection region may be 0.023 mm/px.

In some embodiments, as shown in FIG. 2, the predetermined angle and the target position make the first detection region and the second detection region concurrently satisfy a Gaussian imaging formula. According to the present disclosure, through gradual adjustment, the camera apparatus is mounted at the target position with respect to the battery winder. The first detection region and the second detection region can concurrently satisfy the Gaussian imaging formula in a novel optical imaging mode by adjusting a back focal length, thereby implementing focusing of images on different working planes.

Figure 3:
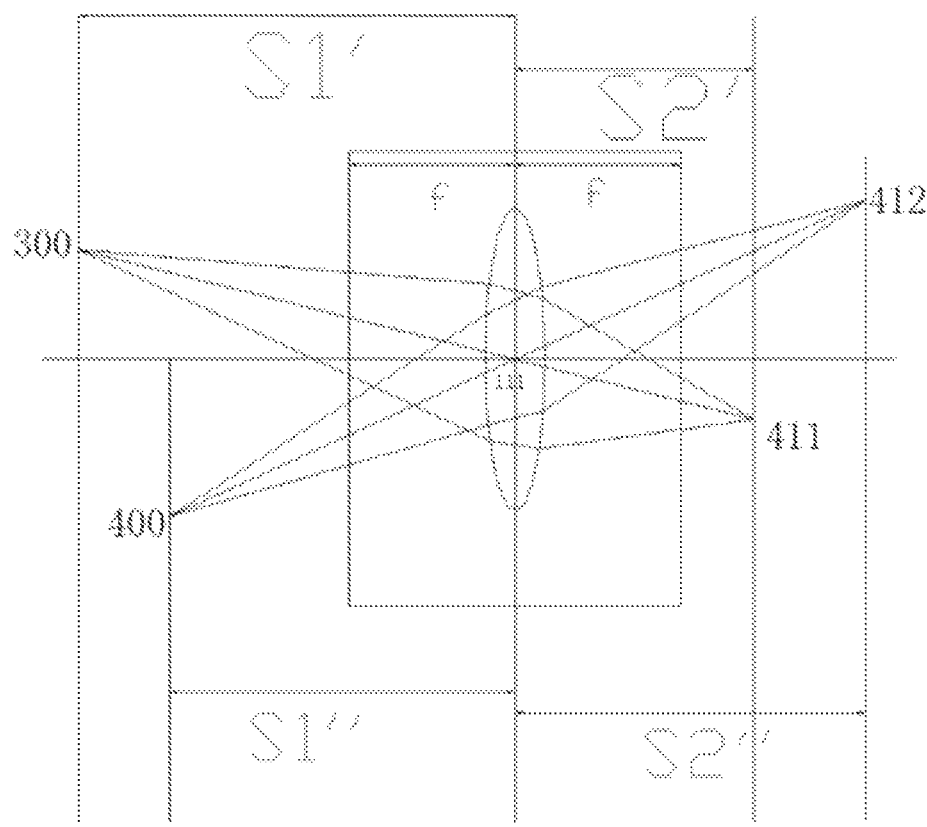
FIG. 3 is a schematic diagram of visual imaging of a lens in a camera apparatus according to some embodiments of the present disclosure.

Referring to FIG. 3, FIG. 3 is a schematic diagram of visual imaging of a lens in a camera apparatus according to some embodiments of the present disclosure. As shown in FIG. 3, a distance S1' between the first detection region 300 and a center 111 of the lens plane of the lens, a distance S2' between the center 111 of the lens plane of the lens and a first imaging point 411 of the sensor target plane of the camera, and a focal length f of the lens satisfy the Gaussian imaging formula, as shown in formula (1) below; and concurrently, a distance S1" between the second detection region and the center 111 of the lens plane of the lens, a distance S2" between the center 111 of the lens plane of the lens and a second imaging point 412 of the sensor target plane of the camera, and the focal length f of the lens satisfy the Gaussian imaging formula, as shown in formula (2) below.

$$1/S1'+1/S2'=1/f \quad (1)$$

$$1/S1''+1/S2''=1/f \quad (2)$$

The specified angle between the sensor target plane of the camera and the lens plane of the lens according to the foregoing embodiments of the present disclosure enables the first detection region and the second detection region to concurrently satisfy the Gaussian imaging formula, thereby implementing focusing of images on different working planes.

In the foregoing embodiments of the present disclosure, when the same convex lens needs to perform imaging at different object distances, the focusing and imaging at different working distances can be implemented by adjusting a back focal length.

The novel optical imaging mode according to the foregoing embodiments of the present disclosure can implement focusing of images on different working planes.

The foregoing embodiments of the present disclosure are adaptable to a circular winding needle. The production capacity of circular winding needles is 2 to 3 times that of prismatic winding needles. For example, the production capacity of circular winding needles is 3 times that of prismatic or oval winding needles, the winding speed of the prismatic or oval winding needles is 600 to 700 mm/s, and the winding speed of circular winding needles is 2000 to 2500 mm/s.

In some embodiments, the camera apparatus further includes: a connecting module disposed between the camera and the lens, where the connecting module is configured to implement fastening between the camera and the lens. The present disclosure implements the fastening between the camera and the lens through the connecting module. In this way, the present disclosure can use just a single camera to capture the positive electrode features and the negative electrode features. In addition, the connecting module in hardware design prevents the relative position between the positive electrode plate and the negative electrode plate from being offset by continuous vibration of a stand in a long production process.

In some embodiments, the connecting module includes a lens connecting surface and a camera connecting surface. The lens connecting surface is a connecting surface between the connecting module and the lens. The camera connecting surface is a connecting surface between the connecting module and the camera. An angle between the lens connecting surface and the camera connecting surface is equal to the predetermined angle. In the present disclosure, the angle between the lens connecting surface and the camera connecting surface of the connecting module is set to be the predetermined angle. In this way, during fastening between the camera and the lens, the angle between the sensor target plane of the camera and the lens plane of the lens can be fixedly set to be the predetermined angle.

Figure 4:
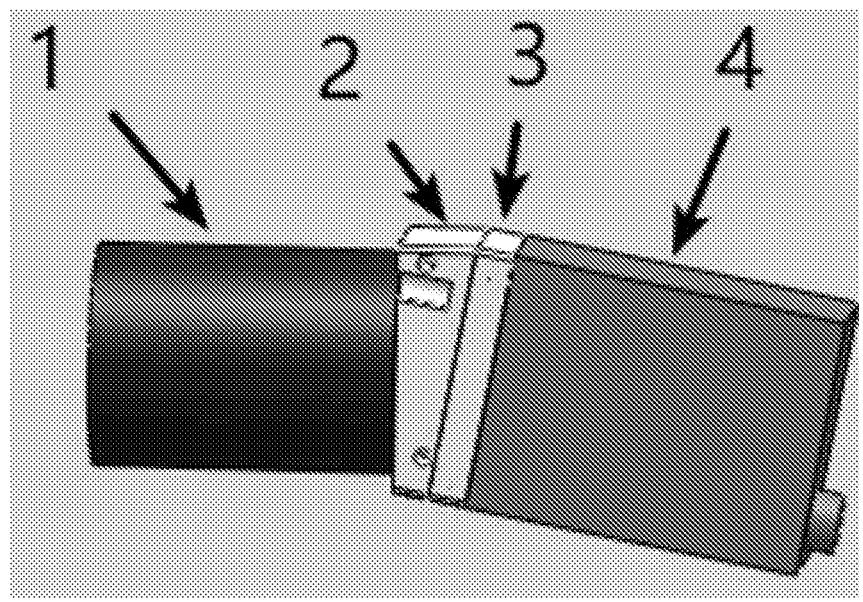
FIG. 4 is a schematic assembly diagram of a camera apparatus according to some embodiments of the present disclosure.
Figure 5:
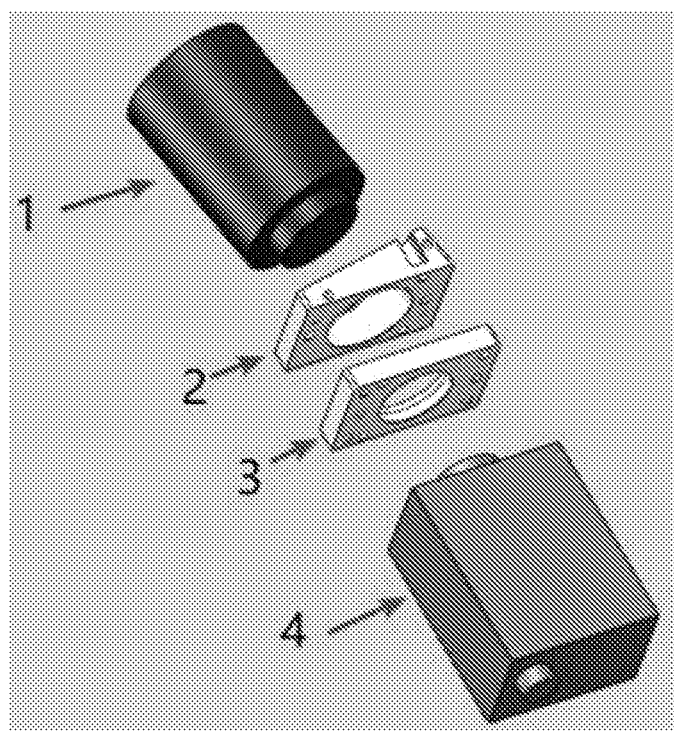
FIG. 5 is a three-dimensional exploded view of a camera apparatus according to some embodiments of the present disclosure.

Referring to FIG. 4 and FIG. 5. FIG. 4 is a schematic assembly diagram of a camera apparatus according to some embodiments of the present disclosure. FIG. 5 is a three-dimensional exploded view of a camera apparatus according to some embodiments of the present disclosure. In some embodiments, as shown in FIG. 4 and FIG. 5, the camera apparatus may include a lens 1, a camera 4, and a connecting module disposed between the camera and the lens. The connecting module includes a first connecting piece 2 and a second connecting piece 3. The first connecting piece 2 is configured to implement fastening to the lens 1 and fastening to the second connecting piece 3. The second connecting piece 3 is configured to implement fastening to the camera 4. An upper surface of the first connecting piece 2 is the lens connecting surface, a lower surface of the first connecting piece 2 is connected to an upper surface of the second connecting piece 3, and a lower surface of the second connecting piece 3 is the camera connecting surface. In some of the foregoing embodiments of the present disclosure, the connecting module includes a first connecting piece 2 and a second connecting piece 3. The lens can be fastened to the camera more conveniently by the two connecting pieces.

In some embodiments, as shown in FIG. 4 and FIG. 5, the angle between the upper surface of the first connecting piece 2 and the lower surface of the first connecting piece 2 is equal to the predetermined angle. The upper surface of the second connecting piece 3 is parallel to the lower surface of the second connecting piece 3. In some embodiments of the present disclosure, the upper and lower surfaces of the first connecting piece 2 may be inclined. To be specific, the first connecting piece 2 serves to implement fastening between the lens and the second connecting piece 3, and, by causing the angle between the upper surface and the lower surface of the first connecting piece 2 to be equal to the predetermined angle, make the overall inclination of the connecting module satisfy the predetermined angle. In some embodiments of the present disclosure, the second connecting piece 3 serves to implement fastening between the first connecting piece 2 and the camera 4. In some embodiments of the present disclosure, the second connecting piece 3 primarily serves as an intermediate hub between the first connecting piece 2 and the camera 4.

In some embodiments, as shown in FIG. 4 and FIG. 5, an external thread of the lens 1 is fastened by an internal thread of the first connecting piece 2. The first connecting piece 2 is fastened to the second connecting piece 3 by small screw holes, threads, and screws around a through-hole. The second connecting piece 3 is fastened to the camera 4 by small screw holes, threads, and screws around the through-hole.

In the foregoing embodiments of the present disclosure, just a single camera is required to capture the positive and negative electrode features. The hardware design according to the foregoing embodiments of the present disclosure prevents the relative position between the positive electrode plate and the negative electrode plate from being offset by continuous vibration of a stand in a long production process.

The novel optical imaging mode implemented by adjusting the back focal length according to the foregoing embodiments of the present disclosure can implement focusing of images on different working planes. The correspondence between the two working planes in the foregoing embodiments of the present disclosure keeps steady and unchanged.

Figure 6:
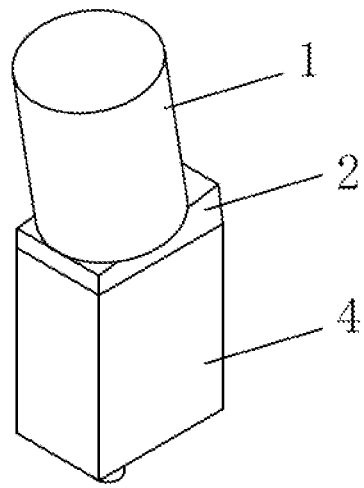
FIG. 6 is a schematic assembly diagram of a camera apparatus according to other embodiments of the present disclosure.

Referring to FIG. 6, FIG. 6 is a schematic assembly diagram of a camera apparatus according to other embodiments of the present disclosure. In some embodiments, as shown in FIG. 6, the camera apparatus may include a lens 1, a camera 4, and a connecting module disposed between the camera and the lens. The connecting module includes a first connecting piece 2. The first connecting piece 2 is configured to implement fastening to the lens and fastening to the camera. An upper surface of the first connecting piece 2 is the lens connecting surface, and a lower surface of the first connecting piece 2 is the camera connecting surface. In some embodiments of the present disclosure, the connecting module includes just the first connecting piece 2. The upper and lower surfaces of the first connecting piece 2 are inclined. To be specific, the first connecting piece 2 serves to implement fastening between the lens and the camera, and, by causing the angle between the upper surface and the lower surface of the first connecting piece 2 to be equal to the predetermined angle, make the overall inclination of the connecting module satisfy the predetermined angle.

Compared with the embodiments shown in FIG. 4 and FIG. 5, the embodiment shown in FIG. 6 reduces the number of connecting pieces. In some embodiments, as shown in FIG. 6, on condition that the design of the first connecting piece 2 is complex enough, the first connecting piece 2 may be directly connected to the camera 4 by small screw holes, threads, and screws around the through-hole.

According to the foregoing embodiments of the present disclosure, the correspondence between the two different working planes during imaging of the camera depends on an angle at which the camera is staggered from the lens by a link mechanism between the camera and the lens.

According to the foregoing embodiments of the present disclosure, the correspondence between the two different working planes during imaging of the camera will not change and the mounting position will not be offset due to external vibration or long-term operation of the camera.

Figure 7:
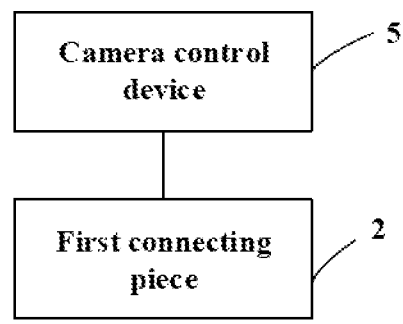
FIG. 7 is a schematic assembly diagram of a camera apparatus according to still other embodiments of the present disclosure.

Referring to FIG. 7, FIG. 7 is a schematic assembly diagram of a camera apparatus according to still other embodiments of the present disclosure. As shown in FIG. 7, the camera apparatus further includes a camera control device 5. The camera control device 5 is connected to the first connecting piece 2. The angle between the upper surface and the lower surface of the first connecting piece 2 is adjustable. The camera apparatus further includes a camera control device. The camera control device 5 is configured to obtain a positional relationship between a first detection region and a second detection region, determine the predetermined angle and a target position based on the positional relationship between the first detection region and the second detection region, adjust the angle between the upper surface and the lower surface of the first connecting piece 2 to the predetermined angle, and mount the camera apparatus to the target position. In the foregoing embodiments of the present disclosure, an angle between the upper surface and the lower surface of the first connecting piece 2 is adjustable. The camera apparatus further includes a camera control device. The camera control device determines the predetermined angle and a target position based on the positional relationship between the first detection region and the second detection region, adjusts the camera apparatus to satisfy the predetermined angle, and mounts the camera apparatus to the target position. In this way, the predetermined angle can be satisfied through adjustment based on the positional relationship between the first detection region and the second detection region.

According to the foregoing embodiments of the present disclosure, a specified structure may be used to implement adjustability of the angle between the upper surface and the lower surface of the first connecting piece 2. Alternatively, according to the foregoing embodiments of the present disclosure, a specified structure may be used to implement adjustability of the angle between the lens connecting surface and the camera connecting surface of the connecting module.

According to the foregoing embodiments of the present disclosure, the connecting module (a link mechanism) between the single camera and the lens may be an adjustable mechanism. Adaptivity can be achieved through adjustment based on different diameters of the winding needle. The angle range of the predetermined angle may be 0 to 20 degrees.

In other embodiments of the present disclosure, as shown in FIG. 7, the camera apparatus further includes a camera control device 5. The camera control device 5 is connected to the first connecting piece 2. The camera control device 5 may be configured to instruct a manufacturing device to prepare beforehand a plurality of first connecting pieces 2 of which the upper surfaces are at different angles to the lower surfaces, obtain a positional relationship between a first detection region and a second detection region, determine the predetermined angle and a target position based on the positional relationship between the first detection region and the second detection region, select a first connecting piece 2 with an angle between an upper surface and a lower surface equal to the predetermined angle as a first connecting piece 2 to be applied, and mount the camera apparatus to the target position.

In this way, in the foregoing embodiments of the present disclosure, a plurality of first connecting pieces 2 of which the upper surfaces are at different angles to the lower surfaces can be prepared beforehand. The camera control device determines the predetermined angle and the target position based on the positional relationship between the first detection region and the second detection region, selects a first connecting piece 2 with an angle between the upper surface and the lower surface being equal to the predetermined angle, uses the first connecting piece 2 as a first connecting piece to be applied, and relocates the camera apparatus to the target position. In this way, in the foregoing embodiments of the present disclosure, depending on different diameters of the winding needle, the first connecting pieces with different angles can be selected to achieve adaptivity. The angle range of the predetermined angle may be 0 to 20 degrees.

Although the present disclosure has been described with reference to exemplary embodiments, various improvements may be made to the embodiments without departing from the scope of the present disclosure, and the components of the present disclosure may be replaced with equivalents. Particularly, to the extent that no structural conflict exists, various technical features mentioned in various embodiments can be combined in any manner. The present disclosure is not limited to the specific embodiments disclosed herein, but includes all technical solutions falling within the scope of the claims.

What is claimed is:

1. A camera apparatus, comprising:
a camera and a lens,
wherein
an angle between a sensor target plane of the camera and a lens plane of the lens is predetermined, and the predetermined angle is greater than 0 degree and less than or equal to 20 degrees;
the camera apparatus is mounted at a target position with respect to a battery winder, and is configured to obtain image information of a first detection region and image information of a second detection region concurrently;
the target position is determined based on the predetermined angle;
the battery winder is configured to wind a positive electrode plate and a negative electrode plate of a battery;
the image information of the first detection region comprises features of the positive electrode plate; and
the image information of the second detection region comprises features of the negative electrode plate.

2. The camera apparatus according to claim 1, wherein the predetermined angle and the target position are such that the first detection region and the second detection region concurrently satisfy a Gaussian imaging formula.

3. The camera apparatus according to claim 2, wherein the first detection region and the second detection region concurrently satisfy the Gaussian imaging formula is:
a distance between the first detection region and a center of the lens plane of the lens, a distance between the center of the lens plane of the lens and a first imaging point of the sensor target plane of the camera, and a focal length of the lens satisfy the Gaussian imaging formula; and
concurrently, a distance between the second detection region and the center of the lens plane of the lens, a distance between the center of the lens plane of the lens and a second imaging point of the sensor target plane of the camera, and the focal length of the lens satisfy the Gaussian imaging formula.

4. The camera apparatus according to claim 1, further comprising:
a connecting module disposed between the camera and the lens, configured to fasten the camera and the lens.

5. The camera apparatus according to claim 4, wherein the connecting module comprises a lens connecting surface and a camera connecting surface, the lens connecting surface is a connecting surface between the connecting module and the lens, the camera connecting surface is a connecting surface between the connecting module and the camera, and an angle between the lens connecting surface and the camera connecting surface is equal to the predetermined angle.

6. The camera apparatus according to claim 5,
wherein the connecting module comprises a first connecting piece and a second connecting piece, the first connecting piece is configured to fasten the lens, the second connecting piece is configured to fasten the camera, and the first connecting piece and the second connecting piece are fastened together; and
wherein an upper surface of the first connecting piece is the lens connecting surface, a lower surface of the first connecting piece is connected to an upper surface of the second connecting piece, and a lower surface of the second connecting piece is the camera connecting surface.

7. The camera apparatus according to claim 6, wherein
the angle between the upper surface of the first connecting piece and the lower surface of the first connecting piece is equal to the predetermined angle; and
the upper surface of the second connecting piece is parallel to the lower surface of the second connecting piece.

8. The camera apparatus according to claim 5, wherein the connecting module comprises a first connecting piece configured to fasten the lens and the camera, an upper surface of the first connecting piece is the lens connecting surface, and a lower surface of the first connecting piece is the camera connecting surface.

9. The camera apparatus according to claim 8,
wherein an angle between the upper surface and the lower surface of the first connecting piece is adjustable,
wherein the camera apparatus further comprises a camera control device, and the camera control device is configured to:
obtain a positional relationship between the first detection region and the second detection region;
determine the predetermined angle and the target position based on the positional relationship between the first detection region and the second detection region;
adjust an angle between the upper surface and the lower surface of the first connecting piece to the predetermined angle; and
mount the camera apparatus to the target position.

10. The camera apparatus according to claim 5, further comprising a camera control device, wherein the camera control device is configured to:
instruct a manufacturing device to prepare beforehand a plurality of first connecting pieces of which upper surfaces are at different angles to lower surfaces;
obtain a positional relationship between the first detection region and the second detection region;
determine the predetermined angle and the target position based on a positional relationship between the first detection region and the second detection region;
select a first connecting piece with an angle between an upper surface and a lower surface equaling to the predetermined angle as a first connecting piece of a connecting module; and
mount the camera apparatus to the target position.

11. A winder system, comprising a battery winder and a camera apparatus;
wherein
the battery winder is configured to wind a positive electrode plate and a negative electrode plate of a battery;
the camera apparatus comprises a camera and a lens, an angle between a sensor target plane of the camera and a lens plane of the lens is predetermined, and the predetermined angle is greater than 0 degree and less than or equal to 20 degrees;
the camera apparatus is mounted at a target position with respect to the battery winder, and is configured to obtain image information of a first detection region and image information of a second detection region concurrently;

the target position is determined based on the predetermined angle; and the image information of the first detection region comprises features of the positive electrode plate, and the image information of the second detection region comprises features of the negative electrode plate.

12. The winder system according to claim 11, wherein the predetermined angle and the target position are such that the first detection region and the second detection region concurrently satisfy a Gaussian imaging formula.

13. The winder system according to claim 12, wherein the first detection region and the second detection region concurrently satisfy the Gaussian imaging formula is:

a distance between the first detection region and a center of the lens plane of the lens, a distance between the center of the lens plane of the lens and a first imaging point of the sensor target plane of the camera, and a focal length of the lens satisfy the Gaussian imaging formula; and concurrently, a distance between the second detection region and the center of the lens plane of the lens, a distance between the center of the lens plane of the lens and a second imaging point of the sensor target plane of the camera, and the focal length of the lens satisfy the Gaussian imaging formula.

14. The winder system according to claim 11, further comprising:

a connecting module disposed between the camera and the lens, configured to fasten the camera and the lens.

15. The winder system according to claim 14, wherein the connecting module comprises a lens connecting surface and a camera connecting surface, the lens connecting surface is a connecting surface between the connecting module and the lens, the camera connecting surface is a connecting surface between the connecting module and the camera, and an angle between the lens connecting surface and the camera connecting surface is equal to the predetermined angle.

16. The winder system according to claim 15, wherein the connecting module comprises a first connecting piece and a second connecting piece, the first connecting piece is configured to fasten the lens, the second connecting piece is configured to fasten the camera, and the first connecting piece and the second connecting piece are fastened together; and wherein an upper surface of the first connecting piece is the lens connecting surface, a lower surface of the first connecting piece is connected to an upper surface of the second connecting piece, and a lower surface of the second connecting piece is the camera connecting surface.

17. The winder system according to claim 16, wherein the angle between the upper surface of the first connecting piece and the lower surface of the first connecting piece is equal to the predetermined angle; and the upper surface of the second connecting piece is parallel to the lower surface of the second connecting piece.

18. The winder system according to claim 15, wherein the connecting module comprises a first connecting piece configured to fasten the lens and the camera, an upper surface of the first connecting piece is the lens connecting surface, and a lower surface of the first connecting piece is the camera connecting surface.

19. The winder system according to claim 18, wherein an angle between the upper surface and the lower surface of the first connecting piece is adjustable, wherein the camera apparatus further comprises a camera control device, and the camera control device is configured to:

obtain a positional relationship between the first detection region and the second detection region;

determine the predetermined angle and the target position based on the positional relationship between the first detection region and the second detection region;

adjust an angle between the upper surface and the lower surface of the first connecting piece to the predetermined angle; and mount the camera apparatus to the target position.

20. The winder system according to claim 15, further comprising a camera control device, wherein the camera control device is configured to:

instruct a manufacturing device to prepare beforehand a plurality of first connecting pieces of which upper surfaces are at different angles to lower surfaces;

obtain a positional relationship between the first detection region and the second detection region;

determine the predetermined angle and the target position based on a positional relationship between the first detection region and the second detection region;

select a first connecting piece with an angle between an upper surface and a lower surface equaling to the predetermined angle as a first connecting piece of a connecting module; and mount the camera apparatus to the target position.

* * * * *